United States Patent [19]

Lukes

[11] 4,072,472

[45] Feb. 7, 1978

[54] PRODUCTION OF HIGH PURITY SALT FROM HIGH SULFATE SALT DEPOSITS

[76] Inventor: Jerome A. Lukes, 1539 - 33rd St., Ogden, Utah 84403

[21] Appl. No.: 424,179

[22] Filed: Dec. 12, 1973

[51] Int. Cl.² .................. B01D 11/02; B01D 9/02; C01D 3/06; C01D 3/08
[52] U.S. Cl. .................. 23/297; 23/298; 23/295 S; 23/299; 23/302 T; 23/303; 299/5; 423/186; 423/208
[58] Field of Search .......... 23/272 AH, 297, 298, 23/299, 300, 303, 304; 423/186, 208, 209; 299/4, 5

[56] References Cited

U.S. PATENT DOCUMENTS

| 273,623 | 3/1883 | Smith | 299/5 |
|---|---|---|---|
| 681,407 | 8/1901 | Coward | 23/272 AH |
| 874,906 | 12/1907 | Frasch | 299/5 |
| 2,125,624 | 8/1938 | Davis | 299/5 |
| 2,906,599 | 9/1959 | Roland | 23/272 AH |
| 3,155,458 | 11/1964 | Fiedelmann | 23/272 AH |
| 3,386,768 | 6/1968 | Jacoby | 23/272 AH |
| 3,414,384 | 12/1968 | Goerg | 23/272 AH |

FOREIGN PATENT DOCUMENTS

| 862,537 | 2/1971 | Canada | 299/5 |
|---|---|---|---|
| 199,607 | 6/1923 | United Kingdom | 23/272 AH |

*Primary Examiner*—Stephen J. Emery
*Attorney, Agent, or Firm*—Trask & Britt

[57] ABSTRACT

A subterranean salt deposit is solution mined, and the resulting calcium- and sulfate-contaminated brine is treated, e.g., by soda ash, to precipitate insoluble calcium compounds. The resulting slurry is settled, and the effluent clear brine is evaporated in a series of solar ponds to produce high-grade sodium chloride.

The brine becomes progressively more concentrated with respect to sodium sulfate as it moves through the solar ponds. The sulfate-enriched brine may be recycled to the solution mine, evaporated to form a sulfate-contaminated sodium chloride crystal crop, or it may be subjected to winter cooling to remove sulfate values as Glauber's salt, the residual brine being recycled to the solar ponds or the solution mine.

7 Claims, 3 Drawing Figures

PRODUCTION OF HIGH PURITY SALT FROM HIGH SULFATE SALT DEPOSITS

BACKGROUND OF THE INVENTION

1. Field

This invention relates to the recovery of high grade salt from subterranean halite deposits contaminated with calcium and sulfate values. Specifically, it provides a method for recovering salt from such a deposit containing glauberite located in a region suitable for solar evaporation techniques.

2. State of the Art

Halite deposits generally contain calcium- and sulfate-containing minerals such as anhydrite, gypsum, and glauberite. Brines produced by solution mining such deposits typically contain undesirable quantities of dissolved calcium and sulfate values. The usual treatments for removing calcium and sulfate values from such brines involve the addition of reagents. For example, $Na_2CO_3$ or $Na_2PO_4$ are commonly used to precipitate insoluble calcium compounds. Other reagents, notably $BaCl_2$, are then added to the brine to precipitate sulfate values. Such chemical treatment methods are expensive and require disposal of the precipitated impurities. Sulfate values may also be removed by mechanical cooling techniques, but such techniques are expensive and create a disposal problem for the sulfate crystal crop thus produced.

Examples of patents disclosing various methods for treating brines are U.S. Pats. Nos. 2,433,601; 2,906,600; 3,024,612; 3,205,013; 3,385,675; and 3,627,479.

It is also known to expose naturally occurring brines to solar evaporation to recover sodium chloride. U.S. Pat. No. 681,407 discloses such a process which involves first removing sulfate of lime in so called "liming ponds" and then crystallizing sodium chloride in other similar ponds. U.S. Pats. 3,484,195 and 3,432,031 disclose the solar evaporation of natural brines whereby sodium chloride is first recovered and then other products, including calcium and sulfate values, are recovered.

SUMMARY OF THE INVENTION

According to this invention, a subterranean deposit containing NaCl contaminated with calcium and sulfate is contacted with an aqueous solvent to produce an aqueous brine containing dissolved calcium and sulfate values. Brine obtained from the solution mine is first treated with a suitable reagent to remove the calcium values as an insoluble calcium precipitate. Suitable reagents for this purpose include, without limitation, sodium carbonate, sodium phosphate and sodium silicate. Sufficient reagent should be mixed with the raw brine to substantially completely remove all of the calcium values dissolved therein. The treatment itself may be accomplished in any of the conventional fashions known in the art.

As a result of the treatment, a slurry is formed, the aqueous phase of which is a substantially saturated sodium chloride solution containing dissolved sulfate values. The slurry is clarified by conventional techniques; for example, by means of a settling tank or pond, and the clear aqueous phase is transferred to the first of a series of "production ponds" contained within a sodium chloride evaporation zone.

The sodium chloride evaporation zone usually contains a plurality of production ponds, conveniently ten or more, so that the evaporation area of the zone is not substantially reduced when any one of the ponds is drained for harvesting.

The production solar pond series, in practical effect, comprises an evaporation zone within which the brine is maintained saturated with respect to sodium chloride but below the saturated concentration of sodium sulfate (that is, the concentration which would result in any sulfate contamination of the resulting sodium chloride crystal crop in excess of that inherent through entrainment phenomena). The production pond series discharges sulfate-enriched brine into a "disposal" zone, typically a second evaporation zone.

The second or "disposal" zone may comprise several ponds or a single pone, or it may comprise a well, a ditch or other conveying means, depending upon the procedure selected for either disposing of or removing sulfate values from the sulfate-enriched brine. Several optional treatments of this brine are within contemplation.

In certain instances, it is acceptable to simply recycle the sulfate-enriched brine back to the solution mining cavity for ultimate return of the solar ponds. The recycle stream then comprises a portion of the aqueous solvent which contacts the subterranean deposit. This technique may be practiced when the raw brine from the solution mine contains a relatively low concentration of sulfate and/or where the brine volume within the cavity is relatively large with respect to the quantity of brine being recycled. This technique is also practical when the rate of growth of the cavity volume is large enough relative to the volume of sulfate-enriched brine being recycled to the cavity. In any of these situations recycling of the sulfate-enriched brine does not result in increasing the sulfate concentration of the solution in the effluent beyond tolerable limits, typically below about 1 percent by weight. Such a recycling procedure avoids some of the capital investment involved in providing additional pond facilities to contain the sulfate-enriched brine. Recycling the sulfate values to the production cavity often results in suppressing the dissolution of additional calcium values, especially when calcium is present in the deposit as gypsum.

A second alternative is to impound the sulfate-enriched brine and permit its evaporation to dryness, thereby producing a mixed crystal crop of sodium chloride and sodium sulfate, usually in association with minor quantities of other impurities. Another alternative is to return the sulfate-enriched brine (or redissolved, mixed crystal crop) to an abandoned solution mining cavity for disposal.

In a region evidencing a substantial temperature differential between the evaporation season and the coldest winter months, it is feasible to impound the sulfate-enriched brine in a relatively deep pond with relatively small surface area, thereby avoiding or minimizing evaporation. When the brine cools during the winter season, sulfate is crystallized as Glauber's salt, reducing the sulfate concentration in the brine. This brine may then be recycled to the sodium chloride production zone for the recovery of additional sodium chloride values therefrom. In some instances, it is necessary or desirable to dilute the recycled sulfate-enriched brine with fresh brine from the aforedescribed calcium treatment procedures, or with low-sulfate brine contained in the production zone, to insure that no significant quantities of sulfate are co-crystallized with the sodium chloride product.

Of course, any or all of the aforementioned disposal procedures may be combined in a single facility for either concurrent or selective use.

BRIEF DESCRIPTION OF THE DRAWINGS

In the drawings which illustrate what is presently regarded as the best mode for carrying out the invention.

DESCRIPTION OF THE ILLUSTRATED EMBODIMENTS

Figure 1:
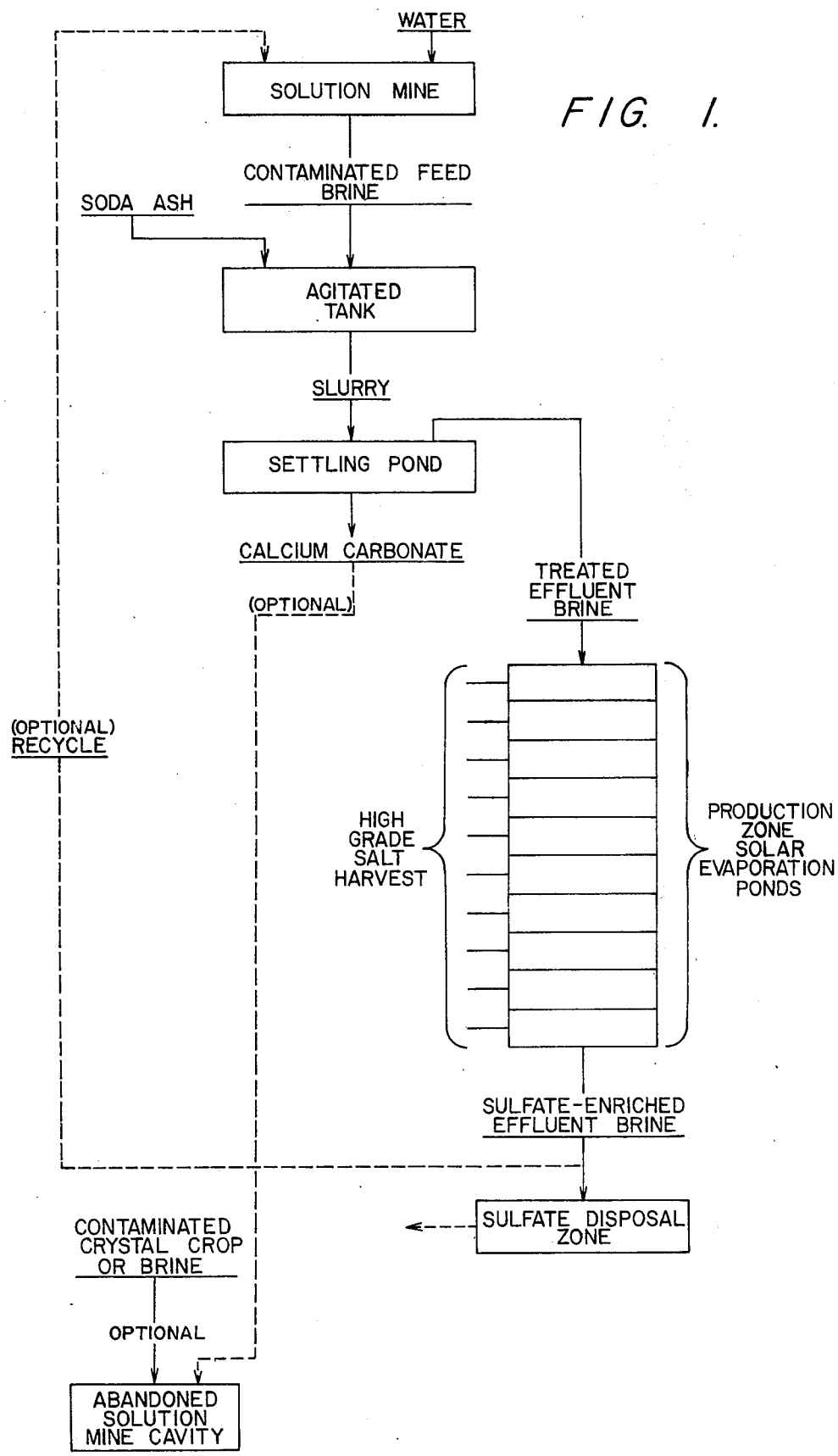
FIG. 1 is a flow sheet showing a typical sequence of steps followed during the evaporation season in the practice of this invention.

The drawings illustrate several practical embodiments of the invention which may be practiced either collectively or selectively, depending upon local circumstances. The flow sheets illustrate the invention as applied to solution mining a halite deposit located in the Detrital Valley in northwestern Arizona. The deposit is of varying quality with the primary contaminant being glauberite ($CaSO_4 \cdot Na_2SO_4$). There may be withdrawn from a solution mining cavity in this deposit a brine containing in excess of about 25% by weight NaCl. The Detrital Valley salt deposit is contaminated with anhydrite ($CaSO_4$) as well as glauberite ($CaSO_4 \cdot Na_2SO_4$). Chemical analyses of core samples taken from the deposit have varied in sulfate content from as little as 1/10 to approximately 3½ percent by weight.

Brine withdrawn from the solution mining cavity is transferred to an agitated tank and mixed with a metered amount of soda ash ($Na_2CO_3$) to precipitate substantially all of the dissolved calcium values as calcium carbonate. Usually, complete removal of calcium from solution may ordinarily be effected with about 5 to 10 grams per liter excess soda ash over that required stoichiometrically to completely react with the calcium in solution. The resulting slurry is transferred into a settling pond wherein the calcium carbonate is settled to the bottom and from which the clear, treated effluent brine is sent to a series of solar ponds.

As illustrated, the production zone includes a plurality of solar evaporation ponds arranged in a series. As the treated brine flows through the series of production ponds, it becomes progressively more concentrated with respect to sulfate. The flow rate is then controlled so that the sulfate-enriched effluent brine from the zone is slightly below its saturated concentration with respect to sulfate. A high-grade salt (NaCl) crystal crop is produced in each of the ponds in this zone. In practice, the solar ponds comprising the production zone are desirably arranged in a fashion to allow bypassing of any pond so that each of the ponds may selectively be drained and the crystal crop therein harvested.

The throughout rate of brine through the production zone is adjusted as required to maintain the dissolved sulfate level in the sulfate-enriched brine exiting the zone below the saturated concentration of sodium sulfate. This concentration varies, depending on climatic conditions and the precise composition of the brine, but it is generally below about 7, more typically below about 6, percent by weight sodium sulfate, based on the total weight of the brine. The maximum solubility of sodium sulfate in a saturated sodium chloride brine is known to be about 7.7 percent by weight at about 18° C. As the temperature of the brine decreases, the sodium sulfate solubility decreases very rapidly to about 4.5 percent by weight at about 13° C. down to about 3.3 percent by weight at about 10° C. At temperatures above about 18° C., the solubility of sodium sulfate also decreases, although somewhat less rapidly, to around 6 percent by weight at about 35° C. Accordingly, during the hottest part of the year, while the evaporation rate is generally highest, the concentration of sulfate in the last pond of the evaporation zone should normally be maintained below about 6 percent by weight. Somewhat higher concentrations are preferred at times of the year when the brine temperature is in a range below 35° but above 18° C. During the winter, when brine temperatures may drop below 18° C., dilution of the brine in the ponds with fresh make-up brine (treated effluent brine) may be necessary to avoid cocrystallization of sodium sulfate with the sodium chloride crystal crops.

Figure 2:
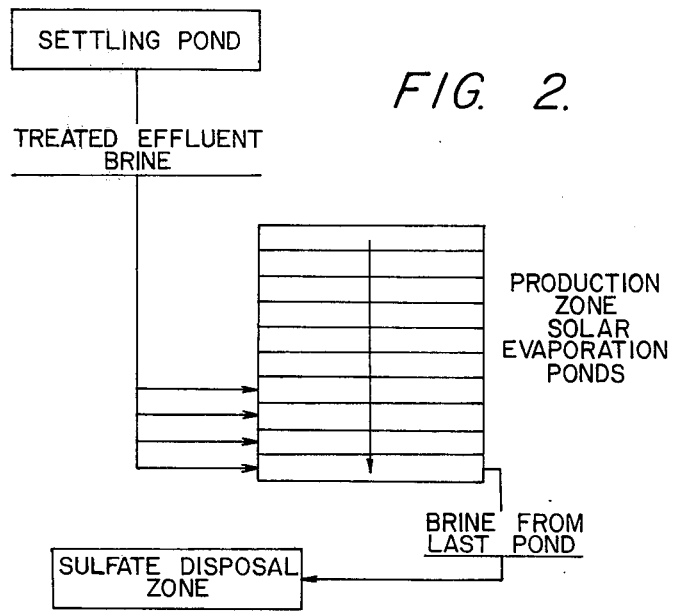
FIG. 2 is a similar flow sheet illustrated typical brine transfers contemplated for use just prior to the cold part of the year.
Figure 3:
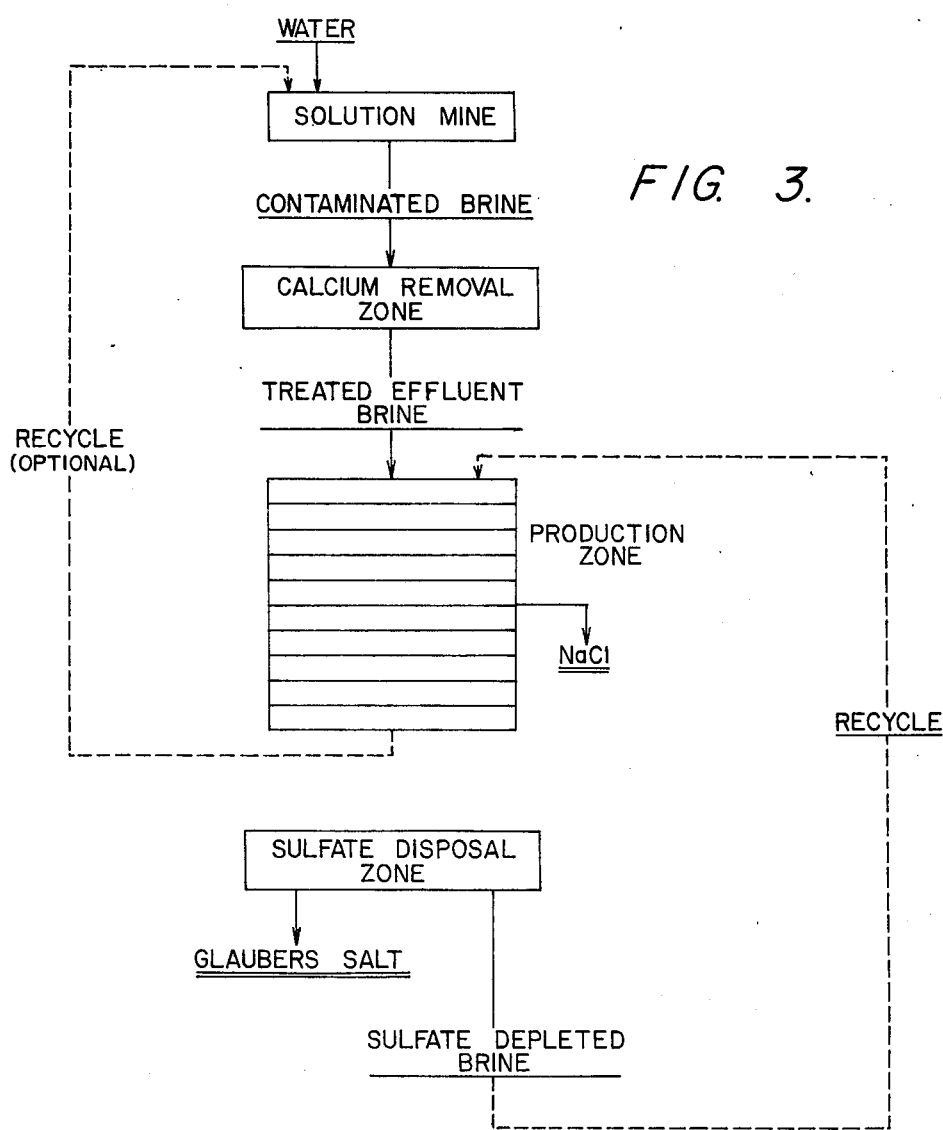
FIG. 3 is a similar flow sheet illustrating typical brine transfers contemplated for the coldest part of the year.

It is within contemplation that all of the brine in the disposal zone be evaporated to dryness to produce a low-quality sodium chloride crystal crop. This crystal crop (or concentrated brine from the disposal zone) may be discarded in abandoned solution mine cavities as shown. FIGS. 2 and 3 illustrate an alternative procedure whereby additional sodium chloride values may be recovered from the sulfate-enriched brines by taking advantage of seasonal variations in temperatures. Referring to FIG. 2, as the winter season approaches, all of the brine in the last pond of the production zone is transferred into the sulfate-disposal zone. The brine levels of the ponds in the production zone are adjusted by internal brine transfers, and each of the ponds within the zone is diluted as required by the addition of fresh treated brine from the settling pond to prevent crystallization of sulfate. Normally, only the last ponds in the series contain brine of sufficient concentration to require dilution. In this fashion, all of the production ponds within the zone contain brine sufficiently dilute with respect to sulfate that during the cooler, low evaporation months, no sulfate is crystallized in the high-grade, sodium chloride crystal crops.

The preferred cold weather brine flow is illustrated by FIG. 3. During the very coldest portion of the winter, the sulfate-enriched brine in the sulfate-disposal zone is cooled sufficiently that some of the sulfate crystallizes. As a consequence, the concentration of dissolved sulfate remaining in the brine of this zone is reduced sufficiently that it may be transferred, as sulfate-depleted brine, back into one or more ponds within the production zone. Generally, this sulfate-depleted brine will be recycled to a production pond containing brine of similar sulfate concentration. During the next evaporation season, the mixed brine contained within the production zone is reconcentrated to the controlled effluent brine sulfate concentration, thereby recovering additional sodium chloride values that have been recycled from the storage zone. Effluent from the production zone may be recycled to the solution mine during the winter season, being of relatively low volume and low sulfate content.

EXAMPLE I

Following the flow sheet of FIG. 1, contaminated brine from a solution mine is treated with soda ash in a settling tank and the treated effluent brine is subjected to solar evaporation in a series of 10 solar ponds in a production zone. All of the sulfate-enriched brine sent to the sulfate-disposal zone is evaporated to dryness. Table 1 reports brine compositions and a material balance for the process, all on a percent by weight basis, based on the treated effluent brine transferred to the production zone.

Table 1

| Brine Identification | Brine Composition | | | | Removed | |
|---|---|---|---|---|---|---|
| | NaCl | $Na_2SO_4$ | $CaSO_4$ | $H_2O$ | $H_2O$ | NaCl |
| Contaminated Feed | 25.6 | 0.29 | 0.28 | 73.83 | | |
| Treated Effluent | 25.5 | 0.59 | | 73.91 | | |
| Sulfate-Enriched[1] Effluent | 2.31 | 0.59 | | 6.93 | 66.98 | 23.19 |

[1] Upon evaporation, all of the NaCl (2.31) and $Na_2SO_4$ (0.59) is deposited in a single crystal crop.

EXAMPLE II

The feed brine of Example I is subjected to the procedures set forth in FIGS. 1, 2 and 3, whereby the sulfate-enriched effluent brine is subjected to winter cooling in a deep disposal pond in the sulfate-disposal zone. The composition of the contaminated feed and treated effluent brines are the same as for Example I. Table 2 reports brine compositions and a material balance on the same basis as Example I for the remainder of the process.

Table 2

| Brine Identification | Brine Composition | | | Removed | |
|---|---|---|---|---|---|
| | NaCl | $Na_2SO_4$ | $H_2O$ | $H_2O$ | NaCl |
| Recycled Sulfate-Depleted Brine (FIG. 3) | 1.61 | 0.22 | 4.75 | | |
| Total Brine Feed to Production Zone | 27.11 | 0.81 | 78.66 | | |
| Total Output from Production Zone | 3.17 | 0.81 | 9.52 | 69.14 | 23.94 |
| Brine Feed to Sulfate-Disposal Zone: | | | | | |
| Warm Weather (FIG. 1) | 2.71 | 0.69 | 8.13 | | |
| Pre-cold Weather (FIG. 2) | 0.46 | 0.12 | 1.39 | | |
| TOTAL | 3.17 | 0.81 | 9.52 | | |

According to this Example, the solids rejected in the sulfate-disposal zone include 0.59 percent by weight (based on the weight of the feed brine introduced to the system) $Na_2SO_4$ and 1.56 percent by weight NaCl.

EXAMPLE III

Following the procedures illustrated by FIG. 1, but recycling all of the sulfate-enriched brine effluent from the production zone back to the solution mine, an amount of salt (25.5 percent, based on the total brine sent to the production zone according to EXAMPLES I and II) equal to that produced in the previous examples is produced. This example assumes that approximately half as much $Na_2SO_4$ and $CaSO_4$ is dissolved as the respective quantities of those substances assumed in the previous examples. Table 3 reports a material balance in proportion to those of Examples 1 and 2.

Table 3

| Brine Identification | Brine Composition | | | | Removed | |
|---|---|---|---|---|---|---|
| | NaCl | $Na_2SO_4$ | $CaSO_4$ | $H_2O$ | $H_2O$ | NaCl |
| Brine Produced in the Cavity by Dissolution | 31.07 | .175 | .170 | 89.60 | | |
| Sulfate-Enriched Brine Recycled from the Production Zone to the Cavity | 8.40 | 2.144 | | 25.20 | | |
| Total Brine Available in Cavity | 39.47 | 2.319 | .170 | 114.80 | | |
| Brine Remaining in Cavity due to entrainment and cavity expansion | 5.57 | 0.327 | .024 | 16.20 | | |
| Contaminated Feed Brine to Treatment | 33.90 | 1.992 | .146 | 98.60 | | |
| Treated Effluent Brine to Production Zone | 33.90 | 2.144 | | 99.20 | | |
| Output from Production Zone | 8.40 | 2.144 | | 25.20 | 74.0 | 25.50 |

I claim:

1. A process comprising:
contacting a subterranean deposit containing NaCl contaminated with calcium and sulfate with an aqueous solvent to produce an aqueous brine containing dissolved calcium and sulfate values;
transferring said contaminated brine to a calcium treatment zone and contacting said brine with a reagent to insolublize said calcium values, thereby producing a slurry with an aqueous phase substantially free from dissolved calcium values;
transferring said aqueous phase to the first of a plurality of solar evaporation ponds arranged in a production zone for series flow such that the brine is maintained at its saturated concentration with respect to NaCl throughout the zone and becomes progressively more concentrated with respect to sulfate in successive ponds, thereby producing an NaCl crystal crop in each of said ponds;
adjusting the flow rate of brine through said production zone to maintain the concentration of sulfate in the last of said ponds below its saturated concentration, thereby producing a sulfate-enriched effluent brine from said production zone;
removing said sulfate-enriched effluent brine from said production zone; and harvesting the NaCl crystal crop from individual solar evaporation ponds of said production zone.

2. A process according to claim 1 wherein said sulfate-enriched effluent brine is transferred to a sulfate-disposal zone; said brine is cooled to depress the solubility of sulfate therein, thereby to form a slurry, the aqueous phase of which is depleted with respect to sulfate values; and said aqueous phase is recycled to said production zone.

3. A process according to claim 2 wherein during a period when the brine is the production zone is cold, sulfate-enriched effluent brine from said zone is returned to said subterranean deposit.

4. A process according to claim 1 wherein said sulfate-enriched effluent brine is recycled to contact said subterranean deposit as a portion of said aqueous solvent.

5. A process according to claim 1 comprising:

contacting a subterranean halite deposit contaminated with glauberite ($CaSO_4 \cdot Na_2SO_4$) with an aqueous solvent to produce an aqueous brine containing dissolved calcium and sulfate values;

transferring said contaminated brine to an agitated reaction zone and mixing said brine in said reaction zone with sufficient reagent selected from the group consisting of sodium carbonate, sodium phosphate and sodium silicate to insolublize said calcium values, thereby producing a slurry with an aqueous phase containing substantially all of said sulfate values but substantially free from dissolved calcium values;

transferring said aqueous phase to the first of a plurality of solar evaporation ponds arranged in a production zone for series flow such that the brine is maintained at its saturated concentration with respect to NaCl throughout the zone, deposits a crystal crop of NaCl substantially free from sulfate contaminants in each of said ponds and becomes progressively more concentrated with respect to sulfate in successive said ponds; and adjusting the flow rate of brine through said production zone to maintain the concentration of sulfate in the last of said ponds in said zone below about 7 percent by weight, based on the total weight of the brine, thereby producing a sulfate-enriched, NaCl-saturated effluent brine from said zone.

6. A process according to claim 5 wherein the concentration of sulfate in the production zone during periods in which the ambient air is above about 18° C is maintained below about 6 percent by weight.

7. A process according to claim 5 wherein the sulfate-enriched effluent brine from the production zone is recycled to said subterranean deposit wherein it is mixed with said aqueous solvent, thereby recycling substantially all of the sulfate values extracted from said deposit back to said deposit.

* * * * *